(12) United States Patent
Holmroos

(10) Patent No.: US 8,266,806 B2
(45) Date of Patent: Sep. 18, 2012

(54) COLLAPSIBLE SAW

(76) Inventor: Joni Holmroos, Turku (FI)

( * ) Notice: Subject to any disclaimer, the term of this patent is extended or adjusted under 35 U.S.C. 154(b) by 558 days.

(21) Appl. No.: 12/092,506

(22) PCT Filed: Nov. 2, 2006

(86) PCT No.: PCT/FI2006/000353
§ 371 (c)(1),
(2), (4) Date: Sep. 23, 2009

(87) PCT Pub. No.: WO2007/051902
PCT Pub. Date: May 10, 2007

(65) Prior Publication Data
US 2010/0024227 A1 Feb. 4, 2010

(30) Foreign Application Priority Data
Nov. 2, 2005 (FI) .................................. 20051111

(51) Int. Cl.
*B23D 51/03* (2006.01)
(52) U.S. Cl. ............................................ 30/512
(58) Field of Classification Search ............ 30/507–519; D8/96, 97
See application file for complete search history.

(56) References Cited

U.S. PATENT DOCUMENTS

| | | | |
|---|---|---|---|
| 1,380,628 A * | 6/1921 | Barner | 30/512 |
| 1,429,195 A * | 9/1922 | Donaldson | 30/512 |
| 1,500,406 A * | 7/1924 | McIntire | 30/507 |
| 1,565,861 A * | 12/1925 | McIntire | 30/512 |
| 2,194,494 A * | 3/1940 | Carroll | 30/511 |
| 2,309,816 A * | 2/1943 | Allen | 30/512 |
| 2,532,506 A * | 12/1950 | Mansfield | 30/511 |
| 2,595,288 A * | 5/1952 | Peters | 30/512 |
| 2,667,195 A * | 1/1954 | Kilmer | 30/510 |
| 2,734,536 A * | 2/1956 | Harper | 30/510 |
| 2,910,101 A * | 10/1959 | Canfield | 30/510 |
| 3,149,652 A * | 9/1964 | Swenson | 30/512 |
| 3,191,648 A * | 6/1965 | Dustrude | 30/510 |
| 3,250,307 A * | 5/1966 | Schmidt et al. | 30/512 |
| 3,724,519 A * | 4/1973 | McCord, Jr. | 30/512 |
| 3,905,409 A * | 9/1975 | Bradley | 30/512 |
| 4,361,177 A * | 11/1982 | Miller | 30/512 |
| 4,580,344 A * | 4/1986 | Jinghage et al. | 30/512 |
| 4,637,141 A * | 1/1987 | Allen | 30/512 |
| 5,208,986 A * | 5/1993 | Ryon et al. | 30/512 |
| 5,440,816 A * | 8/1995 | Dustrude | 30/512 |
| 5,590,473 A * | 1/1997 | Wang | 30/512 |
| D379,292 S * | 5/1997 | Schaffer et al. | D8/96 |
| 6,158,131 A * | 12/2000 | Costanzo et al. | 30/512 |
| 6,898,858 B1 * | 5/2005 | Spell | 30/512 |
| 7,644,501 B2 * | 1/2010 | Chao | 30/512 |
| 2004/0020062 A1* | 2/2004 | Ducret | 30/512 |

FOREIGN PATENT DOCUMENTS
WO  WO 2007051902 A1 *  5/2007

* cited by examiner

*Primary Examiner* — Jason Daniel Prone
(74) *Attorney, Agent, or Firm* — Robert L. Shaver; Dykas & Shaver, LLP

(57) ABSTRACT

A collapsible saw including a saw blade with teeth and a saw frame. The frame is made of four parts; a handle, a front piece, a support body and a lever piece. The four frame units fold flat and enclose both sides of the blade and fold out to form a generally U shaped saw frame, with the saw blade stretched between the two ends of the U shaped frame. The frame parts are connected to each other, and the saw has a sawing and a transport mode.

4 Claims, 14 Drawing Sheets

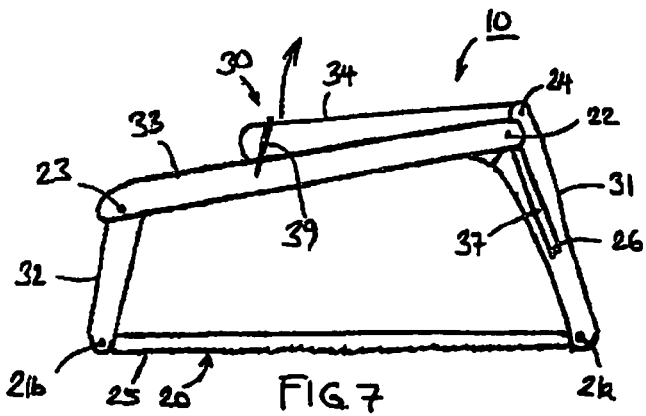
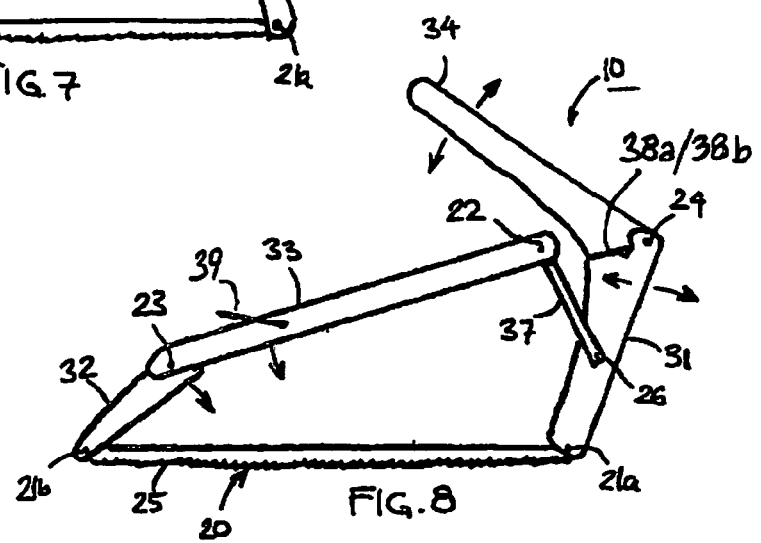
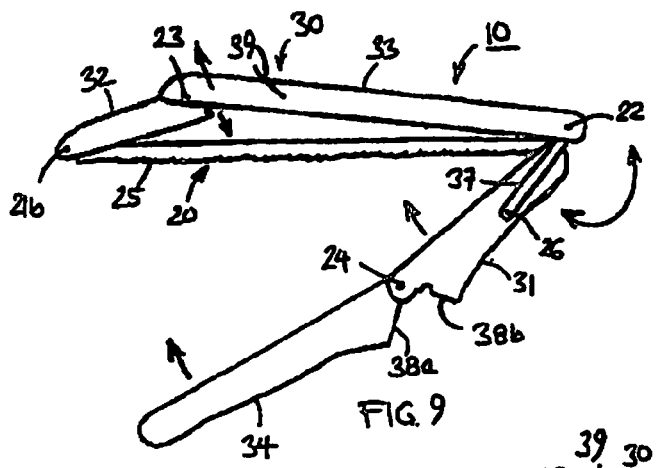
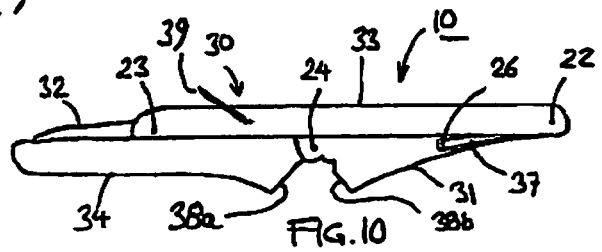

COLLAPSIBLE SAW

OBJECT OF THE INVENTION

The invention relates to a collapsible saw comprising a blade and a bow-like frame construction formed of parts, whereto the blade is attachable and which frame construction can be made smaller for e.g. transportation purposes and to at least partly cover the blade when the saw is not being used.

BACKGROUND

To decrease the size of a saw and to facilitate the transportation thereof is a desirable feature for bow saws. It would also be useful to decrease the dimensions of hack saws, which also have to be transported. A smaller size for each of these types of saws is also practical for storage purposes.

In picnic-saws, many kinds of solutions have been developed, the purpose thereof being to include the sharp teeth of the saw inside the construction in such a way that they may not cause any damage during transportation. In numerous known collapsible bow saws, the blade part is detachable and the bow-like frame part is collapsible. After detaching the blade, the collapsible frame part is folded to the transportation position and the blade is secured e.g. by slipping it into a tube belonging to the frame part or by pushing it into a suitable groove.

However, no such solutions have been developed for the conventional bow saw constructions. The transportation and storage of these saws is still difficult, as the saws are fairly big and have a difficult shape. Further, there is no lasting and safe blade cover available for bow saws.

A hack saw also requires a lot of space in the utensil box, due to its difficult shape. Although the blade of a hack saw is not as sharp as that of wood saws, a blade cover would nevertheless be good to have. No lasting and safe blade cover is available for hack saws, either.

A disadvantage of known collapsible saws, which usually are picnic saws, is that at least one part of the blade or another part of the saw has to be detached before the saw can be transformed into the transportation position. However, the detaching and assembling of the saw is troublesome. Patent publications U.S. Pat. No. 3,954,127, U.S. Pat. No. 5,440,816 and U.S. Pat. No. 2,930,420 disclose saw solutions, which are collapsible in such a way that the blade and/or a part of the blade's bow are detached or moved aside. In such a case, however, the bow of the saw has to be broken by unfastening or loosening a member that fixes the part of the bow, such as a nut or a bolt.

In collapsible form the prior art saws are more practical in view of transportation, but at the same time the collapsible form includes another disadvantage. Numerous known picnic or bow saws have the shape of a triangle, whereby the distance between the blade and the bow is short. This kind of a saw can not be used for sawing thick wood.

SUMMARY

The purpose of this invention is to provide a collapsible saw devoid of the above-mentioned disadvantages.

The collapsible saw according to the invention is characterised in that the parts of the bow-like frame construction of the saw are attached to each other and the frame construction is attached to the blade by means of attaching members, at least one of which is a fulcrum pin, bolt or the like allowing a turning motion between the parts, and/or at least one attaching member is a slide or a corresponding member allowing a transfer motion between the parts, so that the saw is immediately collapsible into a transporting position and can again be transformed into the sawing condition without detaching the parts of the frame construction or the attaching members between them.

The disclosed folding saw is easily transformed into the transporting position without detaching the blade or any other part of the saw. Most preferably, the blade is simultaneously covered so that the sharp teeth of the blade do not cause harm during the transportation. Thus, the blade of the saw is not exposed to objects which could dull the teeth. Accordingly, the saw is easy to turn into the operation condition again, as the blade has not been detached from the frame construction of the saw. The construction according to the invention is particularly advantageous in picnic saws, but nevertheless just as well in conventional bow saws and hack saws.

BRIEF DESCRIPTION OF THE FIGURES

FIG. 7 illustrates a second embodiment of the collapsible saw in side view.

FIGS. 8-9 illustrate the various stages of collapsing the saw of FIG. 7.

FIG. 10 illustrates the saw of FIG. 7 in collapsed form.

PREFERRED EMBODIMENTS OF THE INVENTION

Figure 1:
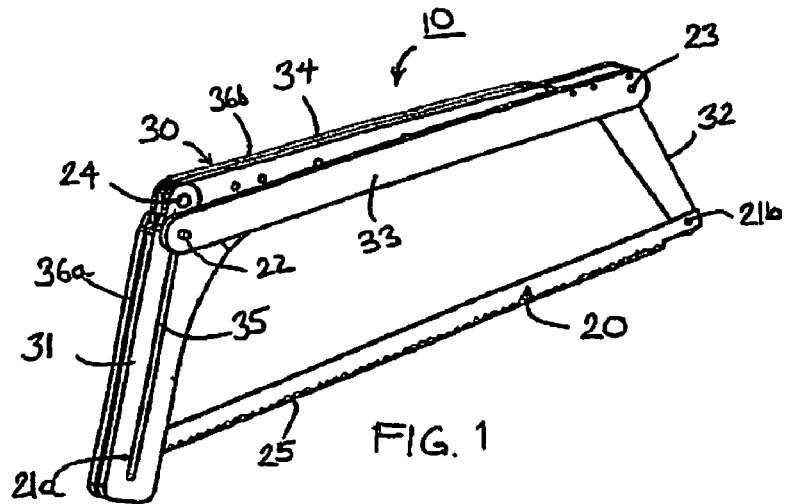
FIG. 1 illustrates a collapsible saw according to the invention in the sawing position as a perspective view.

A preferred embodiment of the collapsible saw 10 according to the invention is characterised in that the collapsible frame construction 30 of the saw comprises a lever part 34, by turning of which the bow part of the saw is collapsible and can be transformed into the transportation position, and that by turning the lever part 34 into the opposite direction, the bow part of the saw can be transformed into the sawing position, whereby the lever part 34 simultaneously acts as a tightening lever for the blade 20 of the saw.

A second preferred embodiment of the invention is characterised in that the turnable lever part 34 of the frame construction 30 is both a tightening lever for the blade 20 when the saw is turned into the operating position and a cover for the teeth when the saw is collapsed.

A third preferred embodiment of the collapsible saw 10 according to the invention is characterised in that the lever part 34 turnable to cover the teeth is attached to the handle part 31 of the frame construction 30.

A fourth preferred embodiment of the collapsible saw 10 according to the invention is characterised in that the lever part 34 turnable to cover the teeth is attached to the front piece 32 of the frame construction 30.

A fifth preferred embodiment of the collapsible saw 10 according to the invention is characterised in that the length of the frame construction 30 of the collapsible saw 10 when in collapsed position is essentially the same as the length of the blade 20 of the saw.

A sixth preferred embodiment of the collapsible saw 10 according to the invention is characterised in that the shape of the frame construction 30 of the callapsible saw when in the sawing position is mainly a quadrangle, such as a rectangle or parallelogram and that the frame construction 30 when in collapsed form has essentially the shape of the blade 20 of the saw and a size only slightly bigger than the blade 20 of the saw.

A seventh preferred embodiment of the collapsible saw 10 according to the invention is characterised in that when the frame construction 30 of the saw is collapsed, the lever part 34 turns to cover the blade 20 from the side of the teeth.

A further preferred embodiment of the collapsible saw 10 according to the invention is characterised in that when the frame construction 30 of the saw is collapsed, the lever part 34 turns to cover the blade 20 of the saw from the side opposite to the teeth.

FIG. 1 illustrates in the sawing position a collapsible saw 10 comprising a blade 20 and a bow-like frame construction 30 holding the blade 20 in a fixed position. The conventional blade 20 is attached to the frame construction 30 in a conventional way so that fixing pins 21a and 21b or corresponding fixing members have been pushed through holes in both ends of the blade 20.

The frame construction 30 of the saw 10 of FIG. 1 comprises a handle part 31, a front piece 32, a support body 33 and a lever part 34, which is attached to the handle part 31 by means of a fulcrum pin 24. The support body 33 connects the handle part 31 and the front piece 32. The support body 33 is connected on one end by means of a fulcrum pin 22 to a conduit 35 in the handle part 31, said conduit 35 being formed of an elongated opening. The fulcrum pin 22 is movable in the conduit 35.

The opposite end of the support body 33, in its turn, is connected to the front piece 32 by means of a fulcrum pin 23.

FIG. 1 shows that the support body 33 is actually formed of two separate support body 33 halves, wherebetween the handle part 31, the front piece 32 and the lever part 34 are arranged.

In the collapsible saw 10 of FIG. 1, both the handle part 31 and the lever part 34 are provided with grooves 36a and 36b, which are of great significance in covering the teeth 25 of the blade 20. As illustrated in the following figures, the handle part 31 and the lever part 34 are turnable onto the blade 20, so that the sharp teeth 25 are covered in the grooves 36a and 36b.

Figure 2:
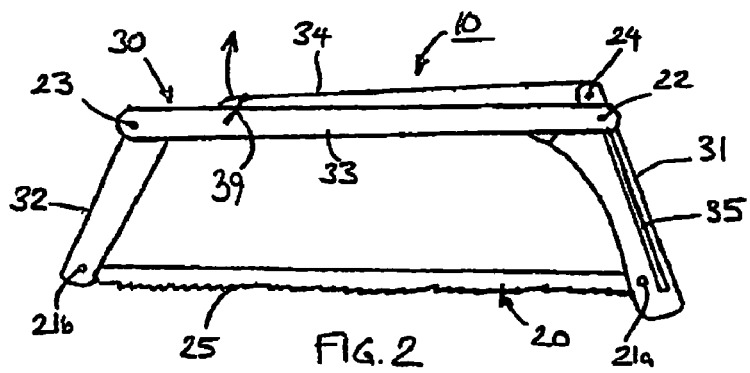
FIG. 2 illustrates an embodiment of the collapsible saw in side view.

FIG. 2 illustrates an embodiment of the collapsible saw 10 in the sawing position in side view. The lever part 34 of the frame construction 30 is then turned between the halves of the two-piece support body 33, whereby the blade 20 of the saw is tightened. The collapsing of the saw 10 begins by lifting the lever part 34 so that it turns around the fulcrum pin 24, as illustrated in the following figures.

Figure 3:
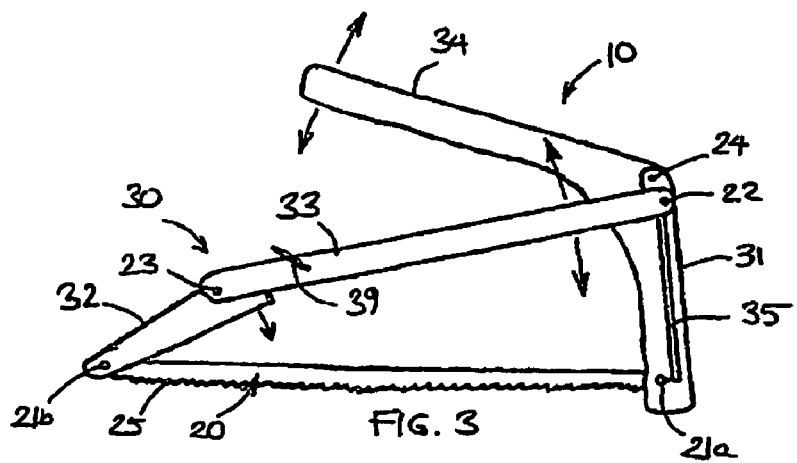
FIGS. 3-5 illustrate the various stages of collapsing the saw of FIG. 2.

In FIG. 3, the lever part 34 of the collapsible saw 10 is lifted upwards, whereby the front pieces 32 and the support body 33 belonging to the bow-like frame construction 30 are turned towards the blade 20 of the saw.

Figure 4:
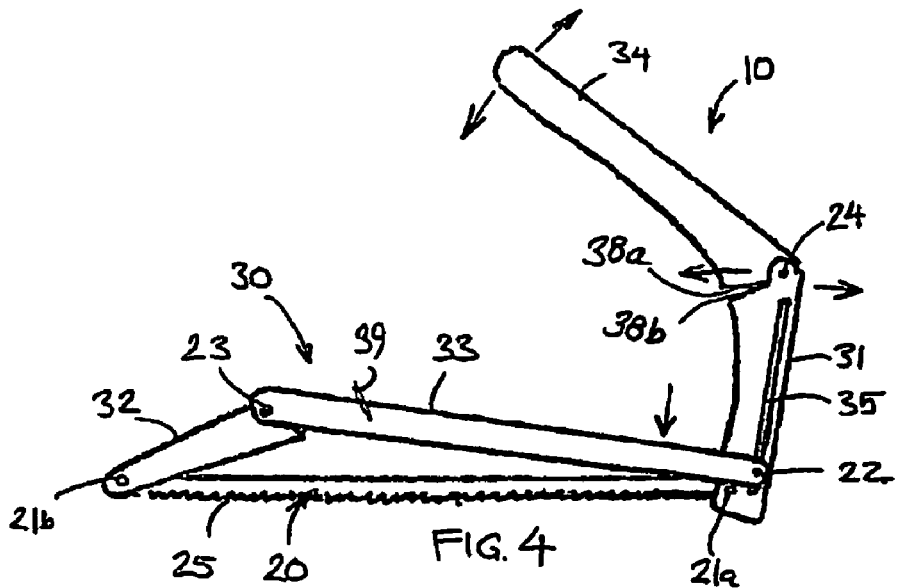

In FIG. 4, the support body 33 is pressed towards the blade 20 so that the fulcrum pin 22 moves in the conduit 35 in the handle 31 towards the blade 20 of the saw.

Figure 5:
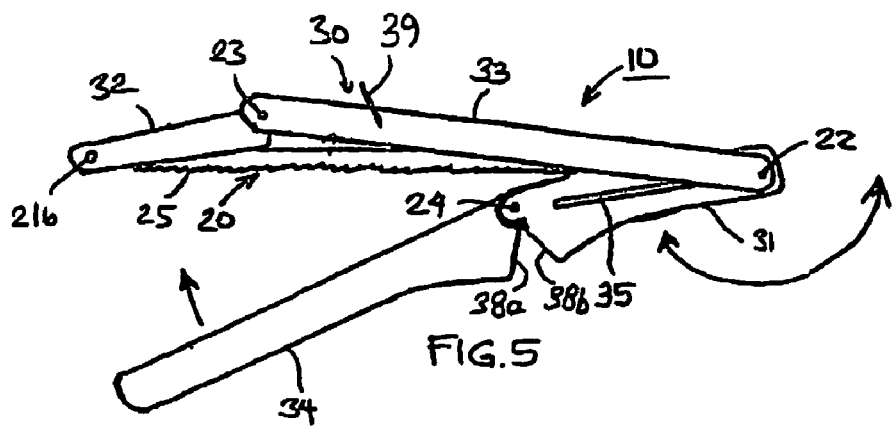

In FIG. 5, the handle part 31 and the lever part 34 are turned around the fulcrum pin 22 so that the handle part 31 and the lever part 34 are pressed towards the teeth 25 of the blade 20.

Figure 6:
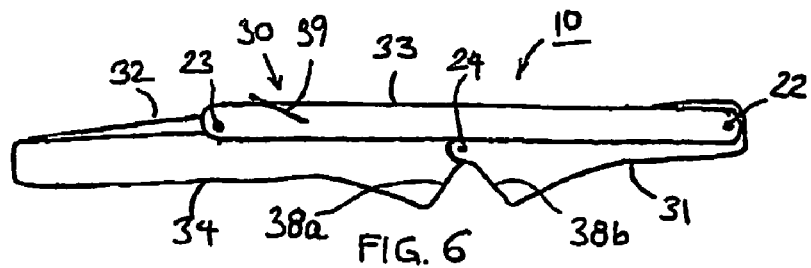
FIG. 6 illustrates the saw of FIG. 2 in collapsed form.

In FIG. 6, the handle part 31 and the lever part 34 of the collapsible saw 10 are pressed against the blade 20 of the saw so that the blade 20 are covered in the grooves 36 of the handle part 31 and the lever part 34, which grooves 36 are more clearly shown in FIG. 1.

An essential thing in the saw 10 illustrated in FIGS. 2-6 is that during collapsing and bringing the saw 10 into the sawing condition, no part of the saw 10 needs to be detached. Every operation can essentially be performed in such a way that the parts 31, 32, 33 and 34 of the frame construction 30 are turned in relation to the blade 20 and in relation to each other around the joints 22, 23 and 24 between the parts and around the fixing pins 21a and 21b of the saw blade 20. In the embodiment illustrated in FIGS. 2-6, the handle part 31 is, in addition to the turning fulcrum pins, further provided with an elongated opening (conduit 35) acting as a conduit for the fulcrum pin 22 located in the end of the support body 33.

The collapsible saw 10 of FIG. 6 is brought into the sawing condition in accordance with FIGS. 2-6, but in the opposite succession. When starting from the situation of FIG. 6, the handle part 31 and the lever part 34 attached thereto by means of a joint 24 are first turned in accordance with FIG. 5 around the fulcrum pin 22 counterclockwise. As a fulcrum pin 24 is also arranged between the fulcrum pin 22 of the lever part 34, the lever part 34 simultaneously turns around the fulcrum pin 24.

In the position shown in FIG. 4, the handle part 31 of the saw 10 is turned to such an extent that it is directed upwards in FIG. 4. The lever part 34 is also turned so that the supporting surfaces 38a and 38b between the lever part 34 and the fulcrum pin 22 are almost attached to each other. After this, the support body 33 is lifted upwards in FIG. 4, whereby the fulcrum pin 22 in the end of the support body 33 is moved to the opposite end of the conduit 35 into the position illustrated in FIG. 3.

When the lever part 34 of the saw 10 is pressed downwards in FIG. 3 between the halves of the two-piece support body 33, the frame construction 30 of the saw 10 is tightened and a tensile stress required for sawing is formed in the blade 20. After that, a fixing loop 39 in the support body 33 is turned onto the lever part 34 so that it is fixed in place and the saw 10 is in the sawing condition illustrated in FIG. 2.

FIG. 7 illustrates the sawing position of another embodiment of the collapsible saw 10, in which a shaft part 37 is arranged between the support body 33 and the handle part 31, with said shaft part 37 connected to the handle part 31 by means of a fulcrum pin 26. When the lever part 34 of the frame construction 30 is turned between the halves of the two-piece support body 33, the saw blade 20 is tightened. In this embodiment, the lever part 34 is fixed in place in the support body 33 by means of a fixing loop 39.

FIG. 8 illustrates how the collapsing of the saw 10 begins, where the lever part 34 has first been detached from the fixing loop 39 of the support body 33, after which the lever part 34 is lifted so that it first turns slightly around the fulcrum pin 24. When the lever part 34 is lifted further, the lever part 34 and the handle part 31 together turn around the fixing pin 21a of the blade 20. Then the front pieces 32 and the support body 33 belonging to the frame construction 30 are turned towards the blade 20 of the saw.

In FIG. 9, the lever part 34 and the handle part 31 together are further turned around the fixing pin 21a of the blade 20 so that the lever part 34 and the handle part 31 approach the blade 20 from the side of the teeth 25.

In FIG. 10, the handle part 31 and the lever part 34 of the frame construction 30 of the collapsible saw 10 are pressed against the blade 20 so that the blade 20 is covered in the grooves 36 of the handle part 31 and the lever part 34.

Also, the saw 10 illustrated in FIGS. 7-10, can be collapsed and turned into the sawing condition without detaching any parts. In this embodiment, the handle part 31 is also devoid of an elongated opening, such as in the embodiments of FIGS. 2-6. When bringing the saw 30 into the sawing condition, the parts 31, 32, 33, 34 and 37 of the frame construction 30 are only turned in relations to each other around the joints 22, 23, 24 and 26 between the parts. Further, the front piece 32 and the handle part 31 are turned around the fulcrum pins 21a and 21b in the ends of the blade 20.

The saw 10 of FIG. 10 is brought into the sawing condition in accordance with FIGS. 7-10, but in the reverse succession. When starting from the situation of FIG. 10, where the saw 10 is in the transporting position, the handle part 31 and the lever part 34 connected thereto by means of a joint 24 are first turned in accordance with FIG. 5 counterclockwise. The shaft part 37 connecting the handle part 31 and the support body 33 thereby follows the motion. The turning of these parts mainly takes place around the fulcrum pin 21a in the end of the blade 20, which fulcrum pin is nevertheless not shown in FIGS. 10 and 9, because it is behind the support body 33 and the shaft part 37. However, FIG. 8 clearly illustrates that the handle part 31 and the lever part 34 are turned around this fulcrum pin 21a.

In the situation of FIG. 8, the lever part 34 has already turned counterclockwise to such an extent that the support surfaces 38a and 38b of the handle part 31 and the lever part 34, which support surfaces are clearly shown in FIG. 9 and which are directed towards each other, have been pressed against each other. When the lever part 34 is further turned in FIG. 8 counterclockwise, it is pressed between the halves of the two-piece support body 33 against the shaft pin 22 in accordance with FIG. 7, simultaneously tightening the blade 20. This situation is clearly seen also in FIG. 1, the saw 10 of which has a corresponding construction. This constructional detail is later illustrated in more detail in FIG. 49. When the lever part 34 is fixed into the support body 33 by means of the fixing loop 39, the saw 10 is turned into the sawing condition without a need to detach any parts or joints of the saw 10.

Figure 11:
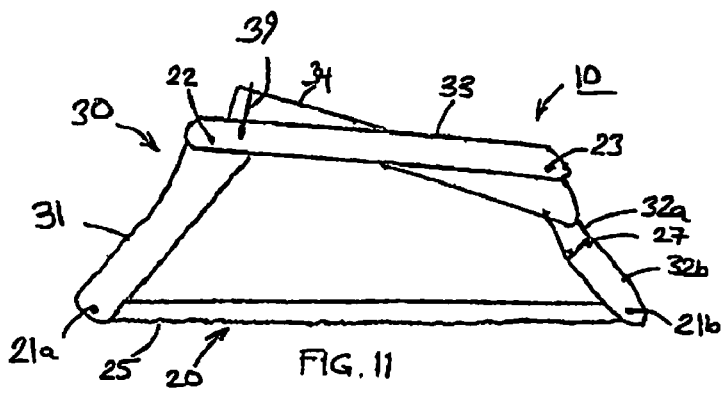
FIG. 11 illustrates a third embodiment of the collapsible saw in side view.

FIG. 11 illustrates a third embodiment of the collapsible saw 10 in the sawing position, where the lever part 34 or the frame construction 30 is connected to the front piece 32 by means of a fulcrum pin 23. The front 32 piece is in this embodiment a two-piece construction in such a way that the parts 32a and 32b of the front piece 32 are connected to each other by means of a fulcrum pin 27. The lever part 34 of the frame construction 30 is in FIG. 11 turned to be in connection with the support body 33, whereby the blade 20 is tightened.

Figure 12:
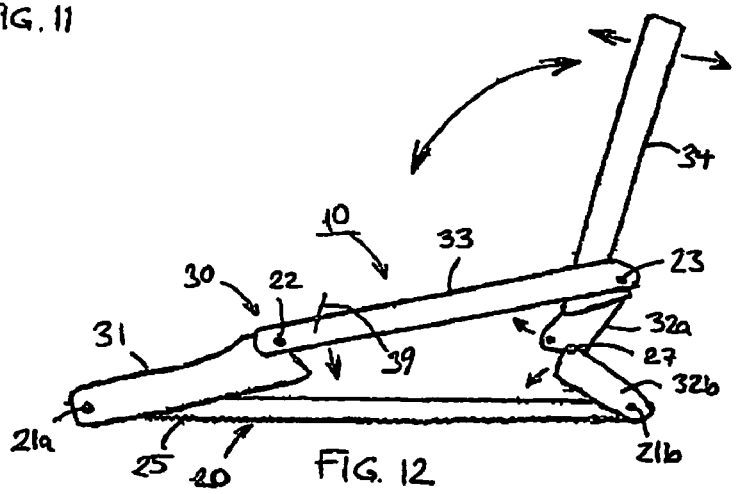
FIGS. 12-13 illustrate the various stages of collapsing the saw of FIG. 11.

In FIG. 12, the collapsing of the saw 10 has been started by lifting the lever part 34 so that it is turned around the fulcrum pin 23. Thereby, the handle part 31 and the support body 33 are turned towards the blade 20 and simultaneously the parts 32a and 32b of the front piece 32 are turned as shown in FIG. 12.

Figure 13:
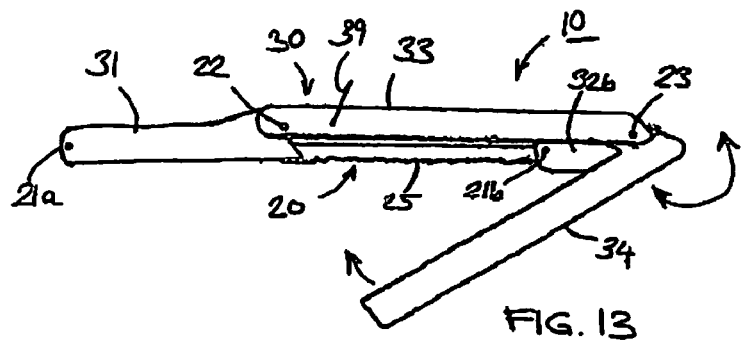

In FIG. 13, the lever part 34 has been turned further so that the handle part 31 turns onto the blade 20 in FIG. 13 from above and the lever part 34 turns onto the blade 20 in FIG. 13 from below.

Figure 14:
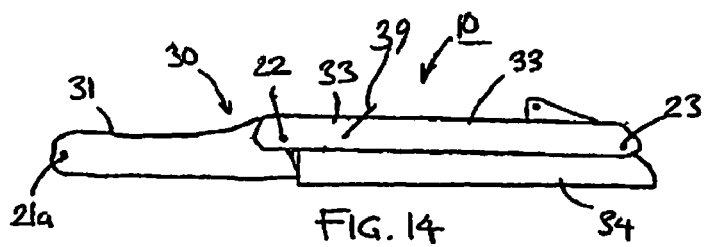
FIG. 14 illustrates the saw of FIG. 11 in collapsed form.

In FIG. 14, the saw 10 is in collapsed form, whereby the handle part 31 and the lever part 34 form a cover for the blade 20. The teeth 25 of the blade 20 are covered in the groove 36 of the lever part 34 in the length of the lever part 34 in such a way that the blade 20 is covered from the direction of the teeth 25 of the blade 20. The rest of the blade 20 goes into the groove 36 in the handle part 31 from the back side of the blade 20. As the groove 36 of the handle part 31 is adequately deep, the blade 20 is well covered in this position as well.

The saw 10 illustrated in FIGS. 11-14 is collapsed and again brought into the sawing condition without detaching any part of the saw 10. In the way illustrated in the previous figures, the collapsed saw 10 of FIG. 14 is brought into the sawing condition in such a way that the lever part 34 is turned in FIG. 14 counterclockwise in the way shown in FIGS. 13 and 14. Thereby, the parts 32a and 32b of the front piece 32 of the frame construction 30 are turned to each others' extensions and the lever part 34 is turnable between the halves of the two-piece support body 33, whereby the blade 20 is tightened. The saw 30 is ready for sawing, when the fixing loop 39 of the support body 33 is fixed in the lever part 34.

Figure 15:
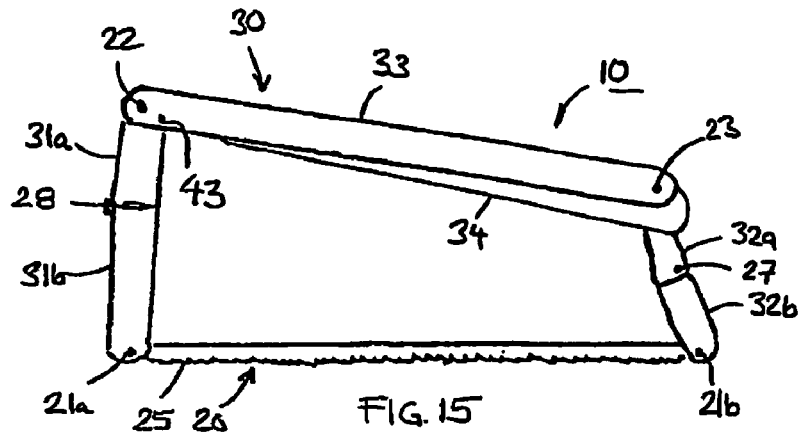
FIG. 15 illustrates a fourth embodiment of the collapsible saw in side view.

FIG. 15 illustrates in the sawing position a fourth embodiment of the collapsible saw 10, wherein the lever part 34 is connected to the front piece 32 by means of a fulcrum pin 23. In this embodiment, both the handle part 31 and the front piece 32 are formed of two parts. The parts 31a and 31b of the handle 31 part are connected to each other by means of a fulcrum pin 28 and the parts 32a and 32b of the front piece 32 are connected to each other by means of a fulcrum pin 27. The lever part 34 of the frame construction 30 is in FIG. 15 turned to be in connection with the support body 33, whereby the blade 20 is tightened.

Figure 16:
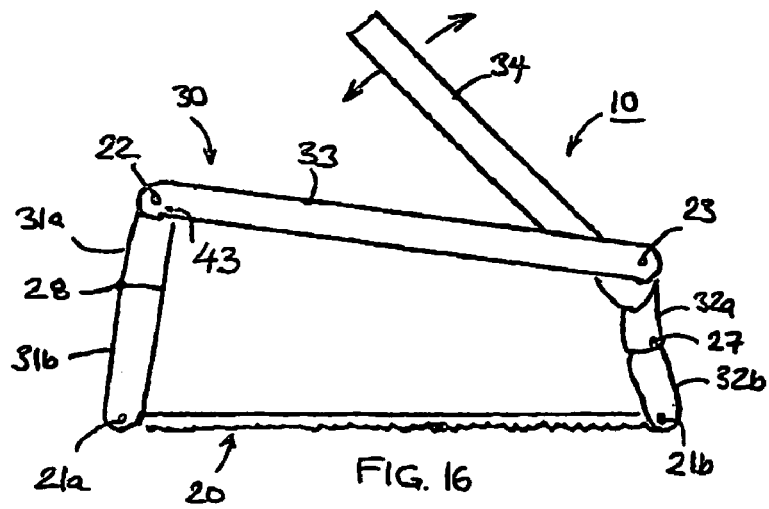
FIGS. 16-19 illustrate the various stages of collapsing the saw of FIG. 15.

In FIG. 16, the collapsing of the saw 10 has been started by lifting the lever part 34 so that it turns around the fulcrum pin 23.

Figure 17:
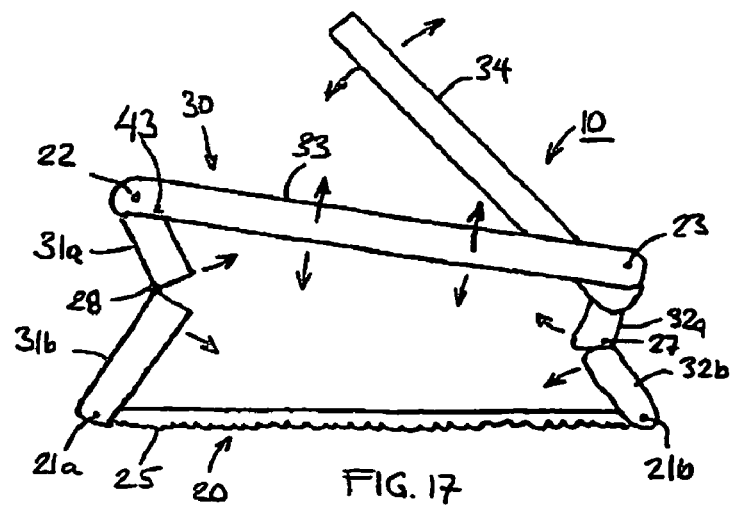
Figure 18:
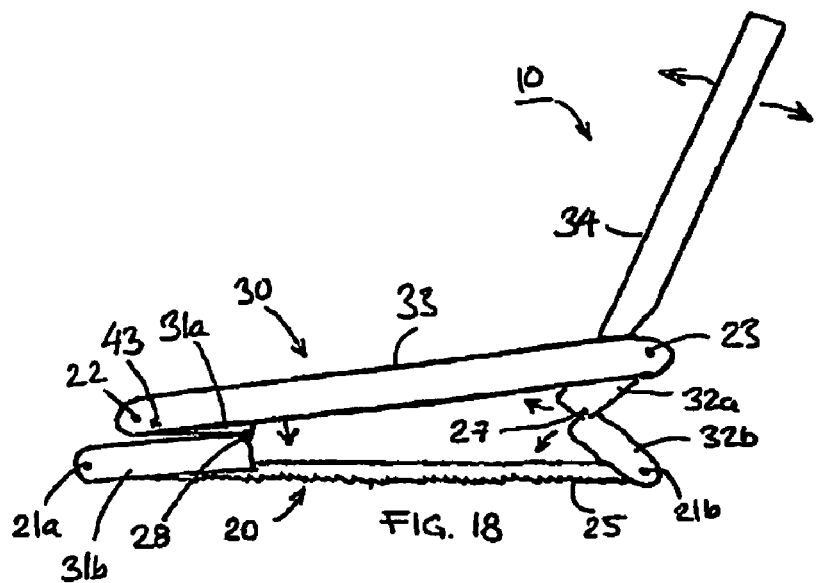

FIG. 17 illustrates a situation where the lifting of the lever part 34 is continued, whereby the parts 31a and 31b of the handle part 31 and the parts 32a and 32b of the front piece 32 are turnable in the way illustrated in FIGS. 17 and 18. Thereby the support body 33 approaches the blade 20.

In the embodiment of the saw illustrated in FIGS. 15-20, reference numeral 43 shows a place for a fixing pin 21 or other corresponding fixation. As the front piece 32 is formed of two parts 31a and 31b, its staying as a straight bar illustrated in FIGS. 15 and 16 has been ensured by means of a fixing pin 43. After the tension of the frame 30 of the saw 10 and the tightening of the blade 20 have first been removed by lifting the lever part 34 in accordance with FIG. 16, the fixing pin 43 is removed and the parts 31a and 31b of the front piece 32 are collapsible as shown in FIG. 17.

Figure 19:
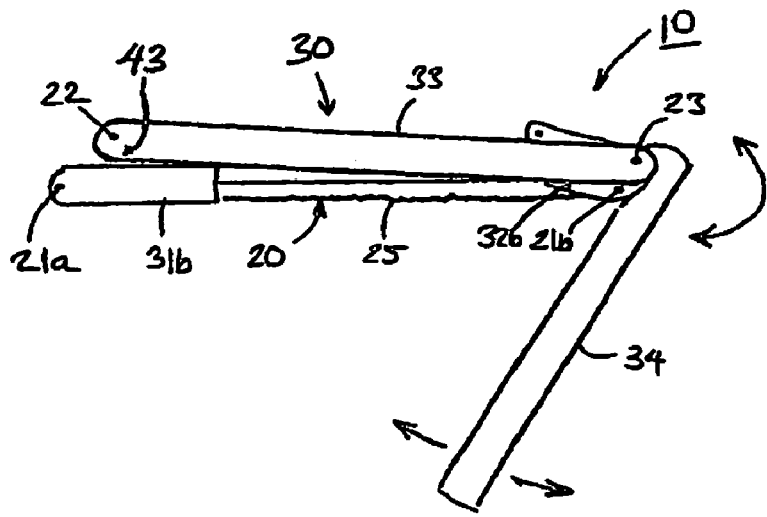

In FIG. 19, the lever part 34 is turned further, whereby the lever part 34 approaches the blade 20 in FIG. 19 from below.

Figure 20:
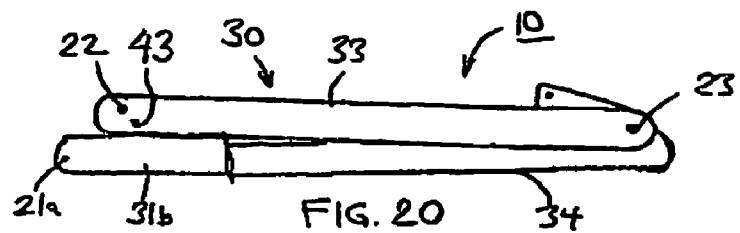
FIG. 20 illustrates the saw of FIG. 15 in collapsed form.

In FIG. 20, the saw 10 is in collapsed form, whereby the part 31b of the handle part 31 and the lever part 34 form a cover for the blade 20. The teeth 25 of the blade 20 are covered in the groove 36 of the lever part 34 in the length of the lever part 34 so that the blade 20 is covered from the direction of the teeth 25. The rest of the blade 20 goes into the groove 36 in the part 31b of the handle part 31 from the back side of the blade 20. As the groove 36 in the part 31b is adequately deep, the blade 20 is well covered in this position, too.

The saw 10 illustrated in FIG. 20 is turned into the sawing condition accordingly by turning the lever part 34 as shown in the embodiments of FIGS. 11-14. This embodiment, however, requires a fixing for keeping the front piece 32 formed of two parts 31a and 31b straight in the situation of FIG. 16, when the blade 20 is tightened by turning the lever part 34. For that purpose, the saws of FIGS. 15-20 are provided with a fixing pin 43. It can, however, as well be e.g. a spring-loaded fixing nail, which automatically fixes the parts 31a and 31b after they have been turned to form a straight bar according to FIG. 16.

Figure 21:
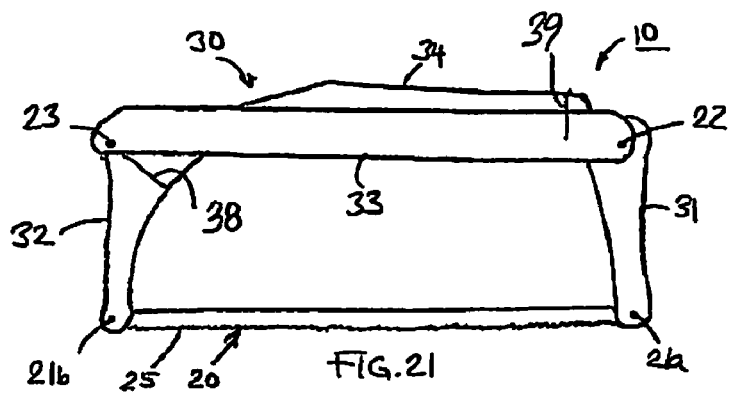
FIG. 21 illustrates a fifth embodiment of the collapsible saw in side view.

FIG. 21 illustrates in the sawing position a fifth embodiment of the collapsible saw 10, wherein the lever part 34 is connected to the front piece 32 by means of a fulcrum pin 23. The lever part 34 has been turned to be in connection with the support body 33, whereby the blade 20 is tightened.

Figure 22:
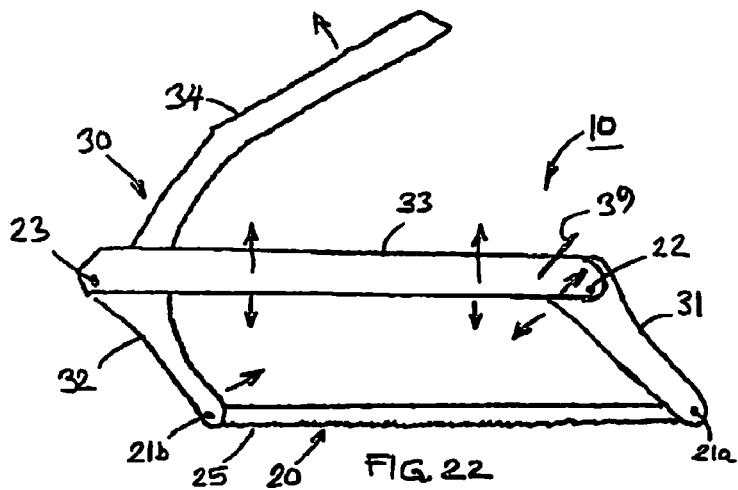
FIGS. 22-23 illustrate the various stages of collapsing the saw of FIG. 21.

In FIG. 22, the collapsing of the saw 10 has been started by lifting the lever part 34 so that it turns around the fulcrum pin 23. Simultaneously the front piece 32 and the handle part 31 are turned around the fixing pins 21a and 21b of the blade 20, whereby the support body 33 starts approaching the blade 20.

Figure 23:
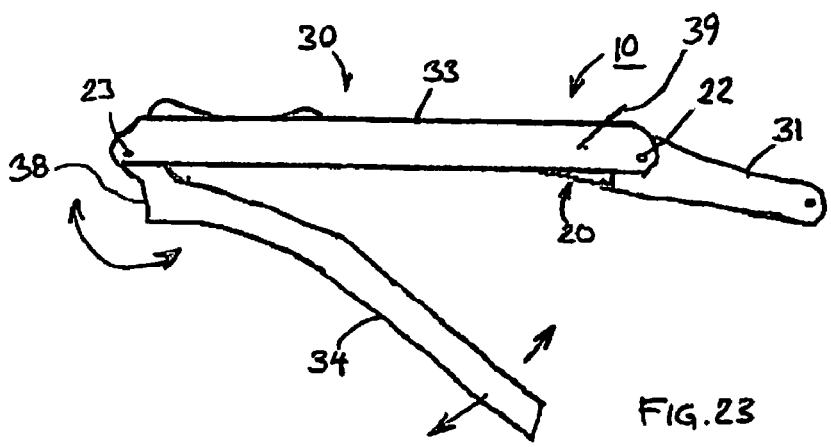

In FIG. 23, the lever part 34 has been turned further, whereby the blade 20 remains inside the support body 33 and the lever part 34 approaches the blade 20 in FIG. 23 from below.

Figure 24:
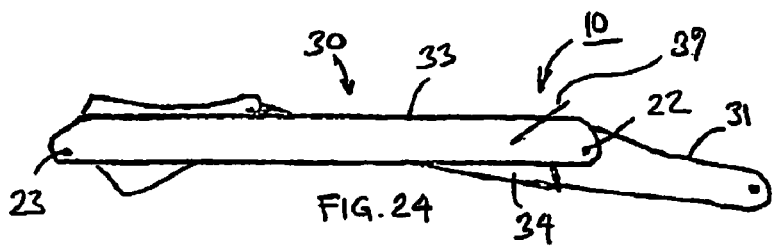
FIG. 24 illustrates the saw of FIG. 21 in collapsed form.

In FIG. 24 the saw 10 is in collapsed form, whereby the blade 20 is inside the support body 33 and the lever part 34 is pressed onto the teeth 25 of the blade 20 for cover.

The saw 10 of FIG. 24 is brought to the sawing condition by turning the lever part 34 clockwise as illustrated in FIGS. 24 and 23. Thereby, the support surface 38 of the lever part 34 is supported onto the corresponding surface of the front piece 32. When in the situation illustrated in FIG. 22 the lever part 34 is further turned clockwise, the lever part 34 is pressed between the halves of the two-piece support body 33, whereby the blade 20 is simultaneously tightened. The saw 30 is ready for sawing when the fixing loop 39 of the support body 33 is fixed in the lever part 34.

Figure 25:
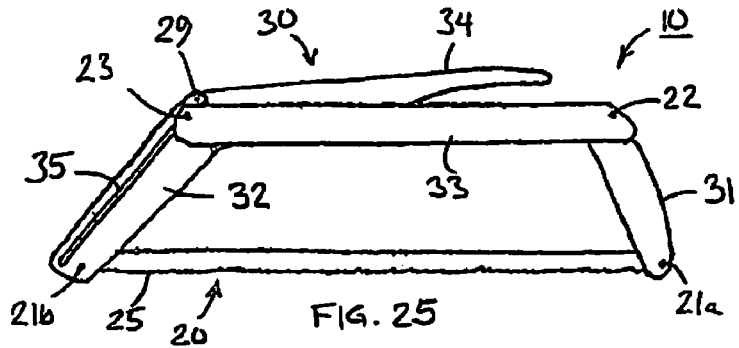
FIG. 25 illustrates a sixth embodiment of the collapsible saw in side view.

FIG. 25 illustrates a sixth embodiment of the collapsible saw 10 in sawing position as a side view. The lever part 34 is turned between the halves of the two-piece support body 33, whereby the blade 20 is tightened. The lever part 34 is connected to the front piece 32 by means of a joint 29.

Figure 26:
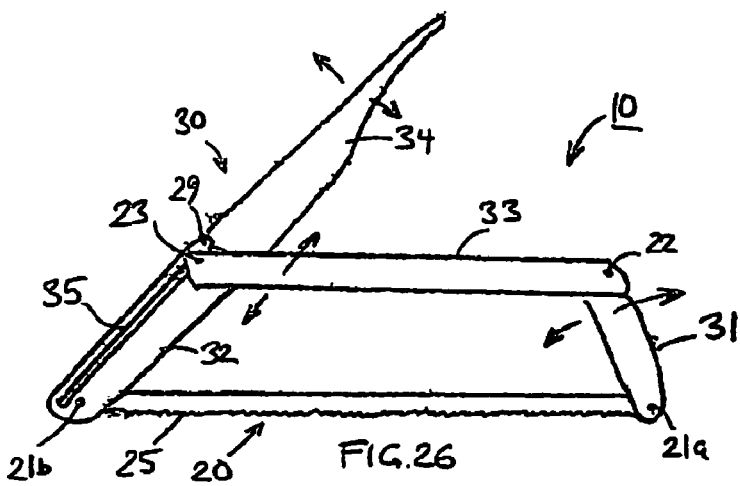
FIGS. 26-27 illustrate the various stages of collapsing the saw of FIG. 25.

In FIG. 26 the collapsing of the saw 10 has been started by lifting the lever part 34, whereby the blade 20 is loosened and the shaft pin 23 in the end of the support body 33 is movable in the conduit 35 arranged in the front piece 32. When the support body 33 is moved towards the blade 20, the handle part 31 simultaneously turns around the fixing pin 21a.

Figure 27:
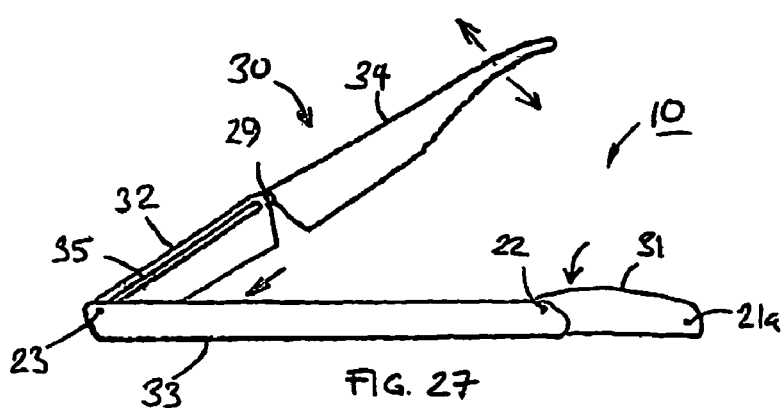
Figure 28:
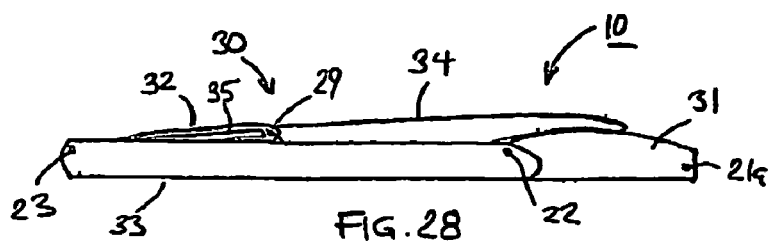
FIG. 28 illustrates the saw of FIG. 25 in collapsed form.

In FIG. 27 the support body 33 and the handle part 31 have been moved onto the blade 20, whereby also the front piece 32 and the lever part 34 are turnable onto the blade 20 for covering it, as shown in FIG. 28.

The saw 10 of FIG. 28 is brought into the sawing condition by turning the lever part 34 and the handle part 31 connected thereto by means of a joint 29 counterclockwise into the position shown in FIG. 27. Thereby the support body 33 is liftable upwards so that the fulcrum pin 23 in the end of the support body 33 moves in the conduit 35 also upwards into the position shown in FIG. 26. When the lever part 34 is after this turned clockwise, the frame construction 30 is stretched and the blade 20 is tightened in accordance with FIG. 25. After this, the saw is ready for use.

The embodiments of the saw 10 illustrated in FIGS. 1-10 and 29-41 are especially preferable, because in them the teeth 25 of the blade 20 are in a folded position hidden along the whole length of the blade 20 and covered in the grooves 36 of the handle part 31 and the lever part 34. In the other illustrated embodiments, the teeth 25 are actually covered, but there is no complete cover on them at the whole length of the blade 20.

The lengths of the bow saws 10 in FIGS. 1-20 and 25-28 and 36-41 are in the collapsed form also mainly only the same as the length of the blade 20. In the embodiments of FIGS. 21-24 and 29-35, the collapsed saw 10 has a length slightly bigger than the length of the blade 20.

Figure 29:
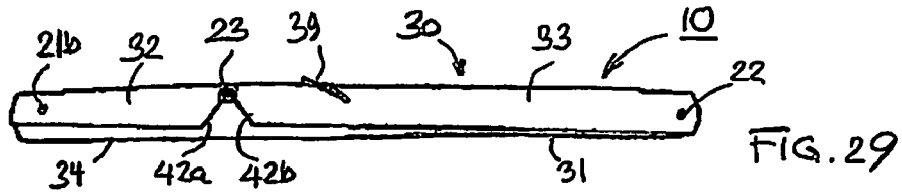
FIG. 29 illustrates a side view of a saw according to a sixth embodiment in collapsed form.

FIG. 29 illustrates in side view a seventh embodiment of the collapsible saw 10 in collapsed form. It can be seen in FIG. 29 that in this position the blade 20 is totally covered by the parts of the frame construction 30 of the saw 10. These parts of the frame construction 30 are a handle part 31, a front piece 32, a support body 33 and a lever part 34. The saw 10 is opened and turned into the sawing condition by turning said parts of the frame construction 30 into another position without having to detach any part of the saw 30 during this operation.

Figure 30:
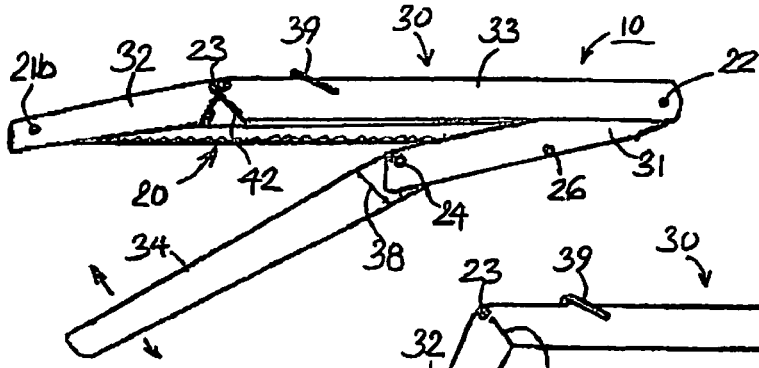
FIGS. 30-34 illustrate the various stages of bringing the saw of FIG. 29 into the sawing condition.
Figure 31:
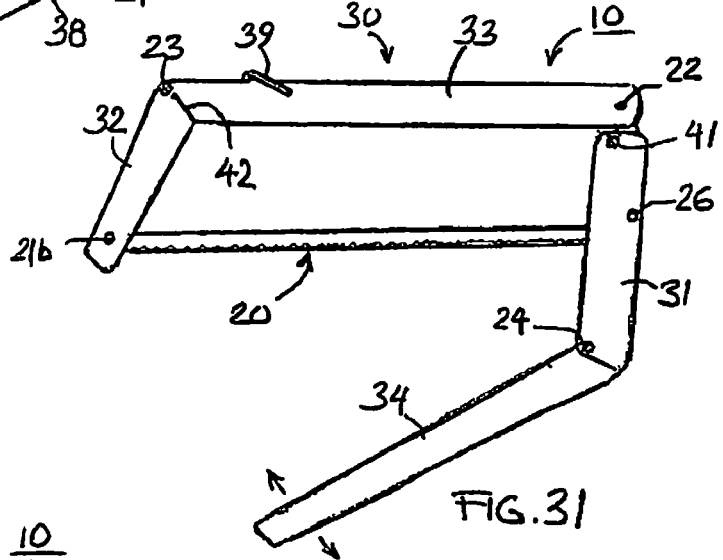
Figure 32:
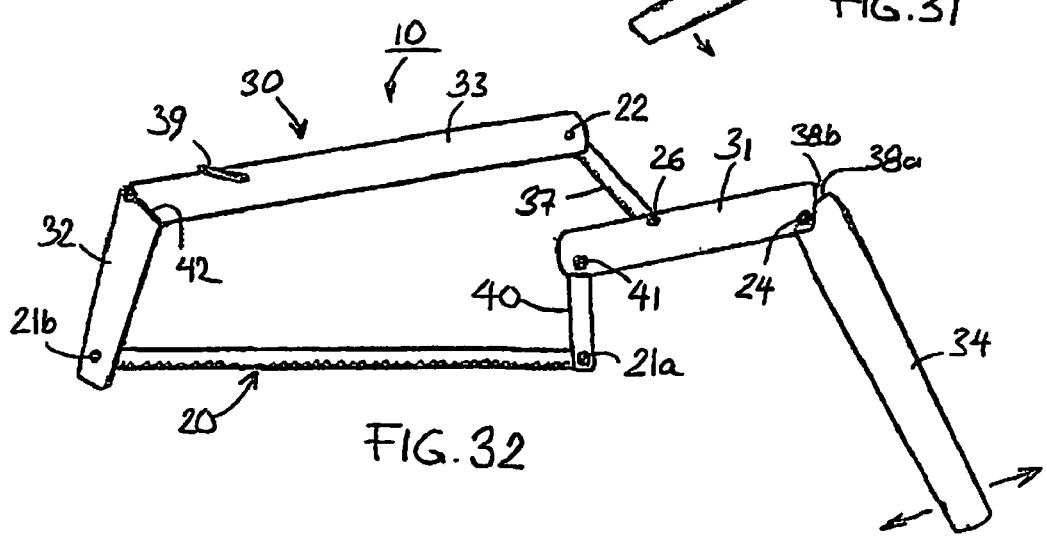

Bringing the saw 10 into the sawing condition is started by turning the lever part 34 and the handle part 31 connected thereto by means of a fulcrum pin 24 counterclockwise in the way illustrated in FIG. 30. When the lever part 34 and the handle part 31 are further turned counterclockwise into the positions shown in FIGS. 31 and 32, it is noticed that in this embodiment the handle part 31 is connected to the 20 by means of an extension part 40 and a fulcrum pin 41. To the support body 33 the handle part 31 is connected via a shaft part 37, in the way as shown in the embodiments of FIGS. 7-10.

Figure 33:
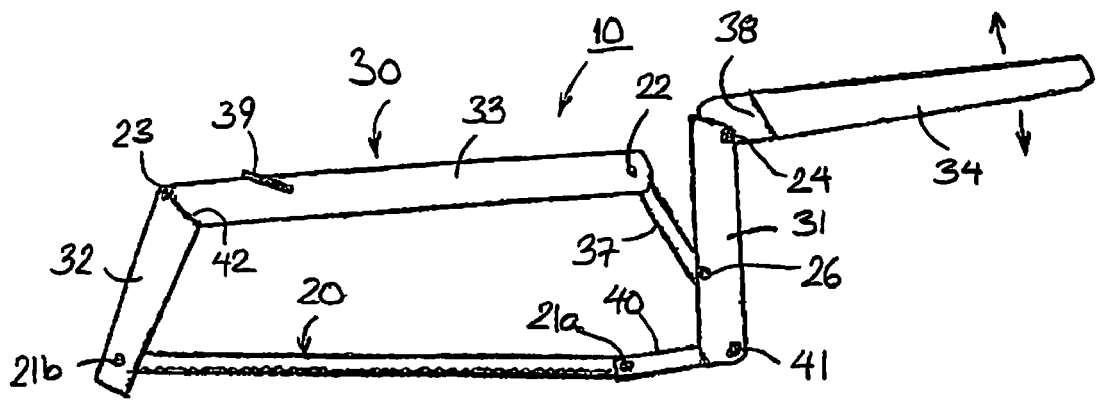
Figure 34:
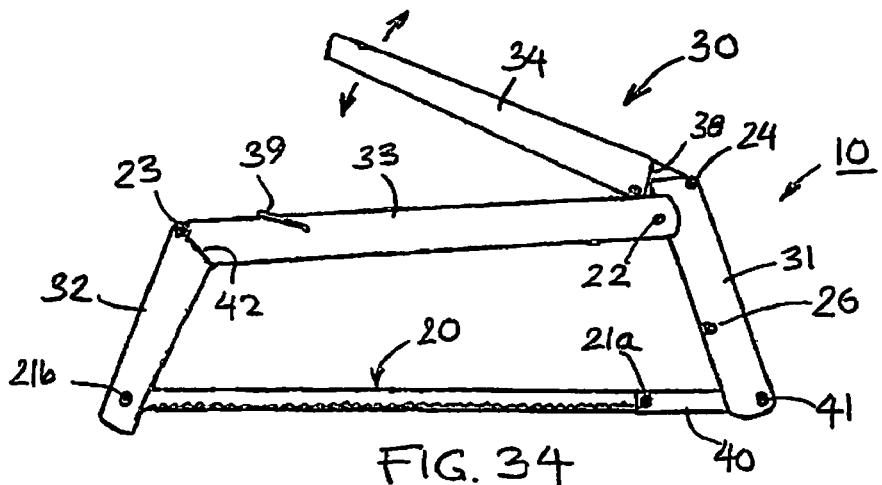
Figure 35:
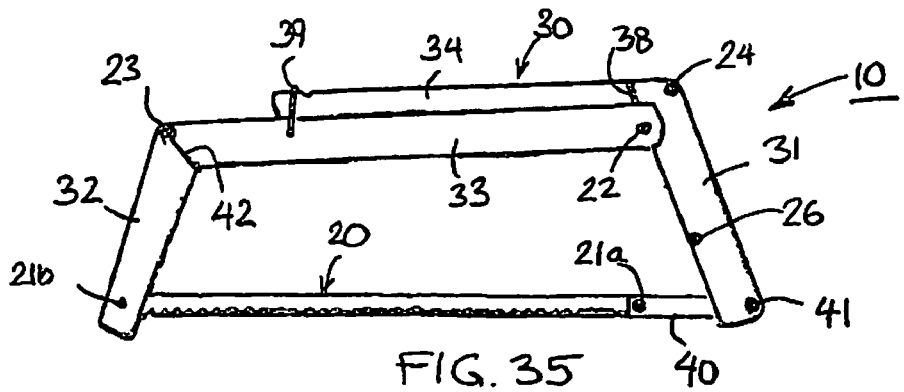
FIG. 35 illustrates the saw of FIG. 29 in the sawing position.

It is seen in FIGS. 33-35 that by means of the extension part 40, more space is obtained for fingers of the sawyer in the zone of the handle part 31. Thus, the whole length of the blade 20 may be utilized for sawing and the fingers of the operator do not touch the item being sawed. This embodiment of the invention is most preferable when applied to a hack saw.

It is seen in FIG. 34 that when the lever part 34 is further turned counterclockwise, the handle part 31 approaches the fulcrum pin 22 of the support body 33 and the lever part 34 is turned around the fulcrum pin 24 until the support surfaces 38 between the lever part 34 and the handle part 31 touch each other stopping the turning motion of the lever part 34 in relation to the handle part 31. Thus, the support surfaces 38 define the angle, in which the lever part 34 and the handle part 31 remain in their ultimate position, whereby the lever part 34 simultaneously is fairly close to the support body 33.

The turning of the bar formed of the lever part 34 and the handle part 31 together between the halves of the two-piece support body 33 into the position shown in FIG. 35 requires some strength, whereby simultaneously the frame construction 30 of the saw 10 is stretched and the tightening and tensile stress required for sawing are obtained in the blade 20. Finally, the lever part 34 is fixed in the handle part 31 by means of a fixing loop 39, whereafter the saw 10 has been brought into the sawing condition without having to detach any part of the saw 10 during the operation.

Accordingly, the blade 20 illustrated in FIG. 35 is collapsible by performing the operations illustrated in FIGS. 29-35 in reverse succession. Even then, there is no need to detach any part of the saw 10 and the blade 20 is nevertheless totally covered by means of the parts of the frame construction 30, as illustrated in FIG. 29.

Figure 36:
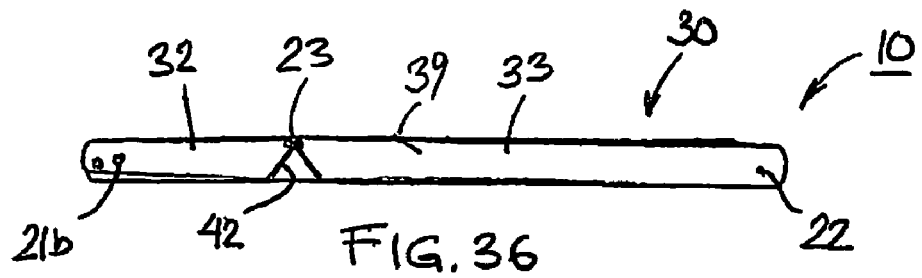
FIG. 36 illustrates a side view of a saw according to a seventh embodiment in collapsed form.

FIG. 36 illustrates a side view of an eighth embodiment of the collapsible saw 10 in collapsed form. This embodiment of the invention is most preferable when applied in a wood saw, wherein when the saw 10 is in the collapsed form, the blade 20 of the saw is totally covered inside the frame construction 30.

FIGS. 37-40 illustrate various states of bringing the saw 10 into the sawing condition. This operations if performed so that all the parts of the frame construction 30 of the saw 10, the joints between the parts and the blade 20 are in their places all the time and attached to each other. FIG. 41 illustrates the saw 10 in the sawing condition. Accordingly, the collapsing of the saw 10 is performed so that all the parts of the frame construction 30 of the saw 10, the joints between the parts and the blade 20 are in their places all the time and attached to each other. No part of the saw 10 or the blade 20 has to be detached or removed during these operations.

Figure 37:
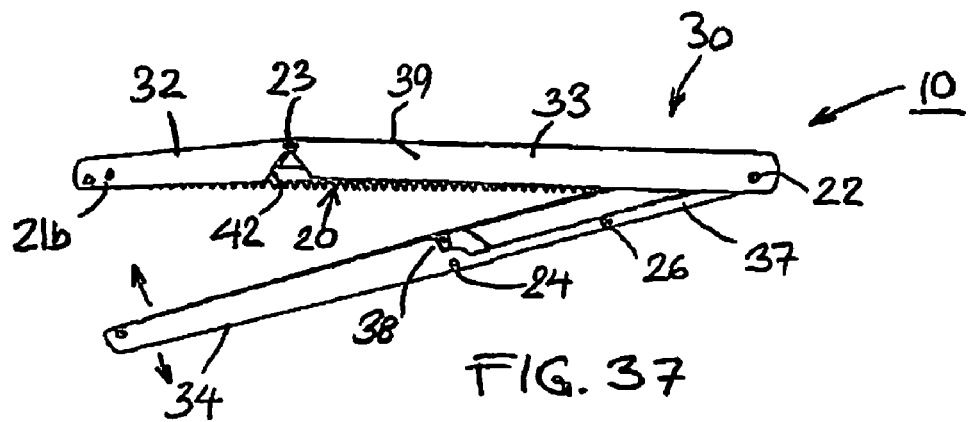
FIGS. 37-40 illustrate the various stages of bringing the saw of FIG. 36 into the sawing position.
Figure 38:
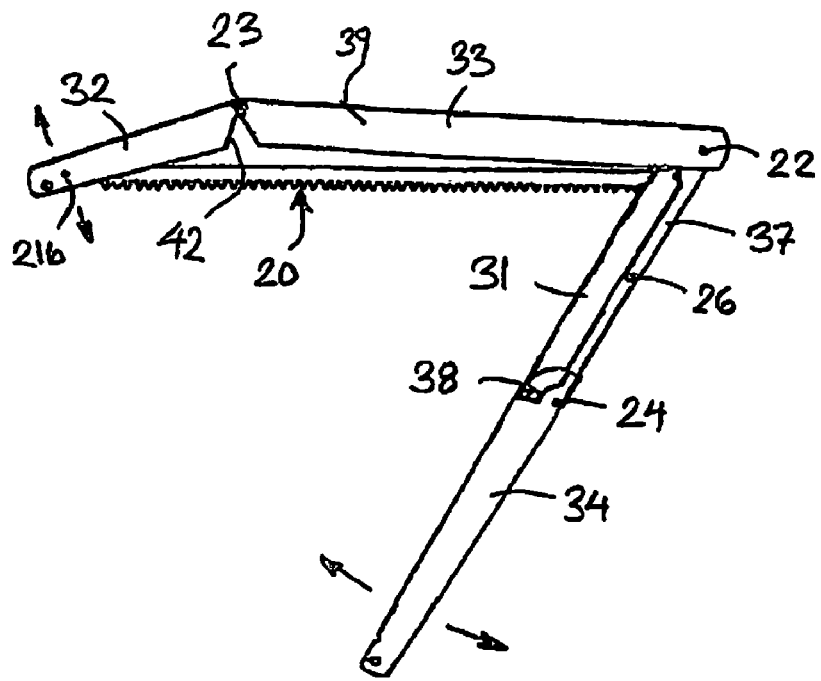
Figure 39:
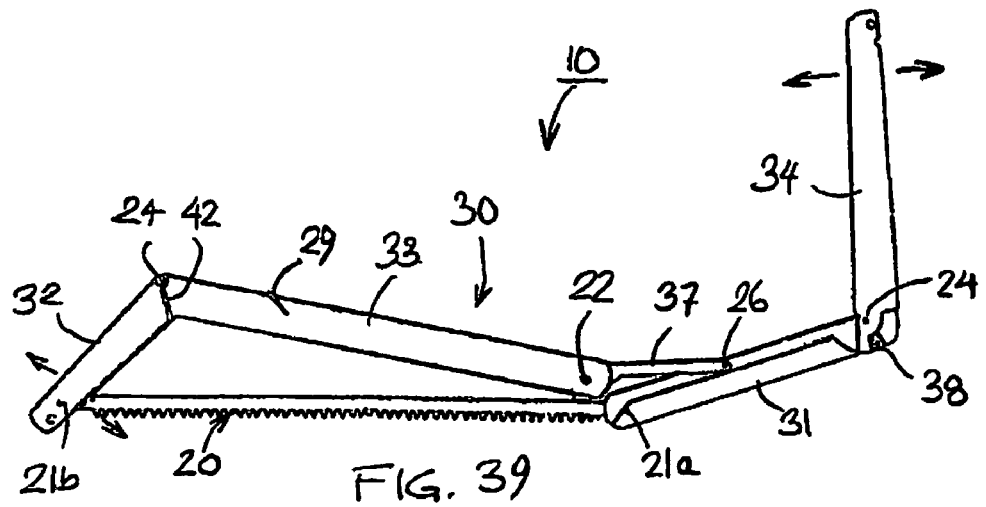

In FIG. 37, the bringing of the saw into the sawing condition has been started by turning the lever part 34 and the handle part 31 counterclockwise in FIG. 37. The turning motion of these parts is continued in accordance with FIG. 38, whereby simultaneously the front piece 32 is turned in relation to the support body 33 counterclockwise in the figure around the fulcrum pin 23. In FIG. 39 the front piece 32 is turned to such an extent that the support surfaces 42 between the front part 32 and the support body 33 touch each other, after which these parts are no more turnable to this direction in relation to each other.

Figure 40:
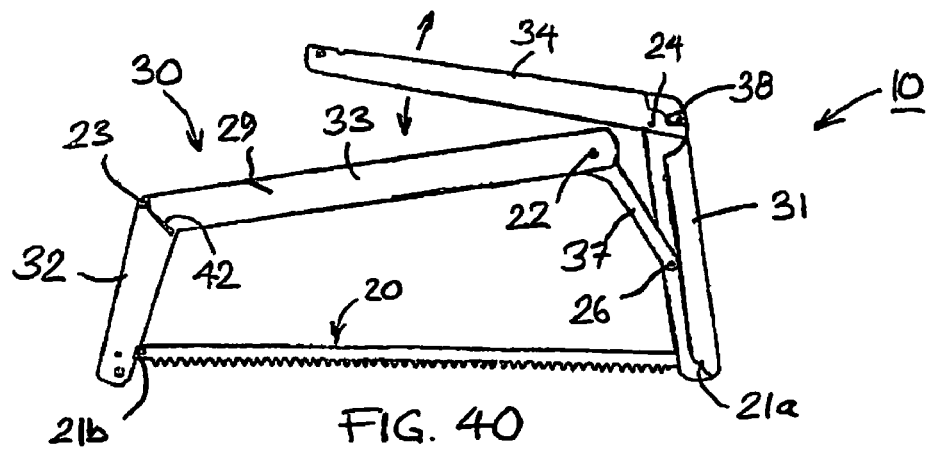
Figure 41:
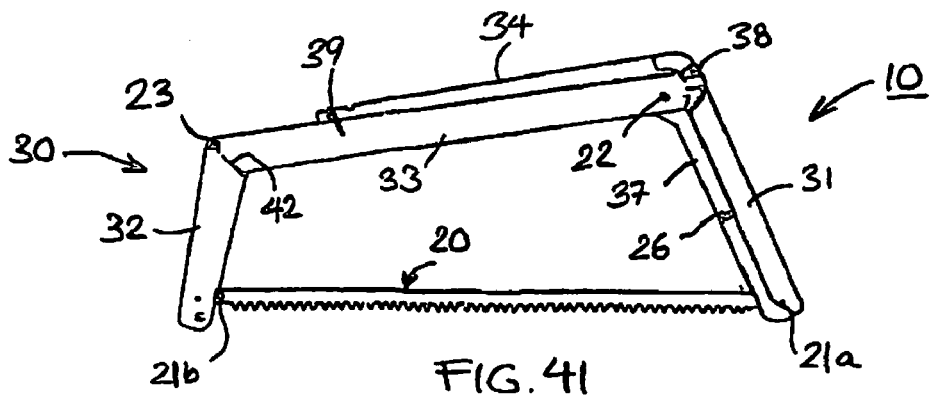
FIG. 41 illustrates the saw of FIG. 36 in the sawing condition.
Figure 42:
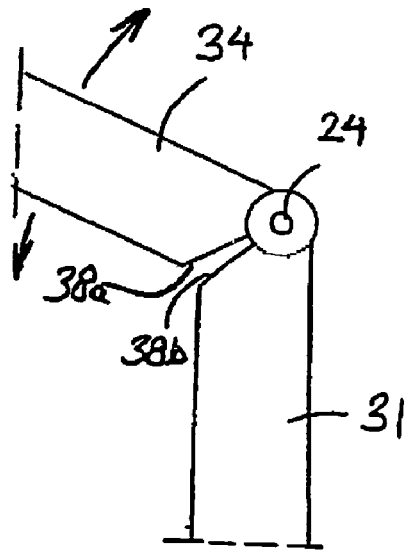
FIGS. 42-49 illustrate details of various embodiments of the saw.
Figure 43:
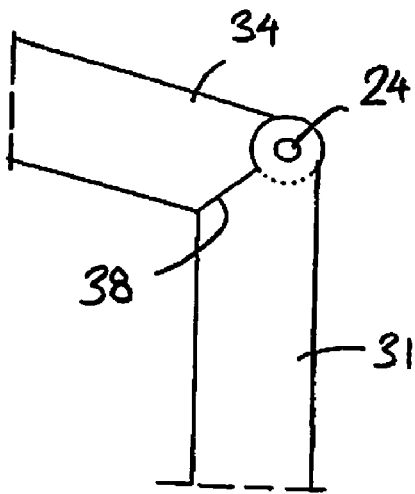
Figure 44:
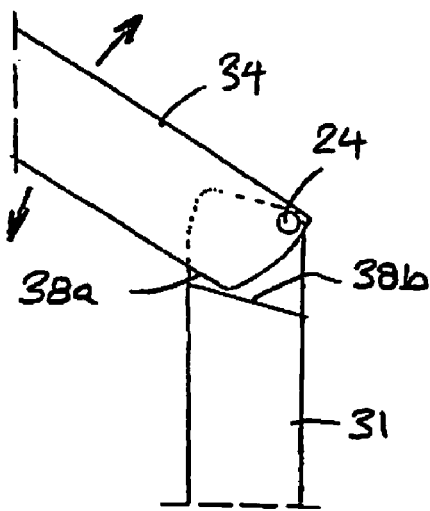
Figure 45:
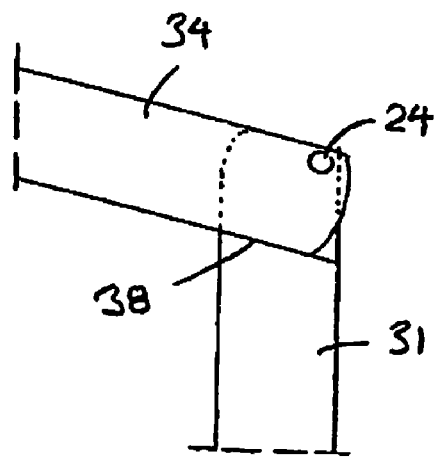
Figure 46:
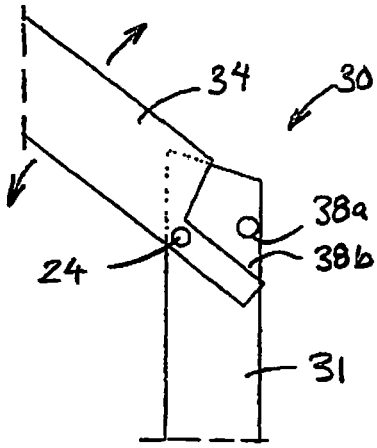
Figure 47:
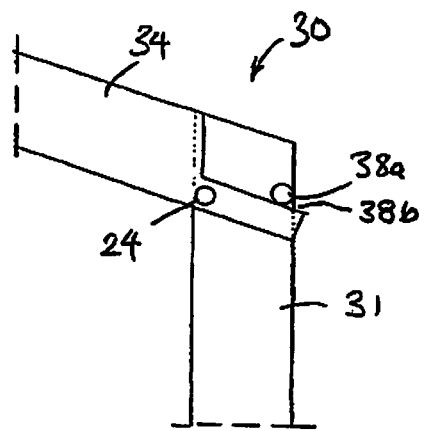

It is seen in FIG. 40, that also the support surfaces 38 between the lever part 34 and the handle part 31 touch each other, whereby the lever part 34 also is no more turnable to this direction in relation to the handle part 31. Now, the front part 32 and the support body 33 in the saw 10 form a bar and the handle part 31 and the lever part 34 form another bar. However, in this situation the lever part 34 is already so close to the support body 33 that these parts can be manually pressed into the proximity of each other. Simultaneously the required tension is obtained in the frame construction 30, which tightens the blade 20 of the saw for sawing purpose. The lever part 34 and the support body 33 are fixed to each other by means of a fixing loop 39, after which the saw 10 is in the sawing condition.

It is to be noticed that the fixing loop 39 between the lever part 34 and the support body 33 is only an exemplary solution and the fixing may just as well be effected in some other corresponding way. Also the illustrated support surfaces between the parts of the frame construction 30 are exemplary solutions and may also be replaced by using other corresponding solutions.

Thus, FIGS. 42-47 illustrate some details of examples for effecting the support surfaces 38 between the handle part 31 and the lever part 34 of the frame construction 30. In the illustrated examples, the handle part 31 and the lever part 34 are turnable in relation to each other when the saw 10 is brought into the sawing condition until their support surfaces 38a and 38b are supported against each other. After that these parts are no more able to turn into this direction, but the parts together form a bar that can be used for tightening the blade 20 of the saw.

Figure 48:
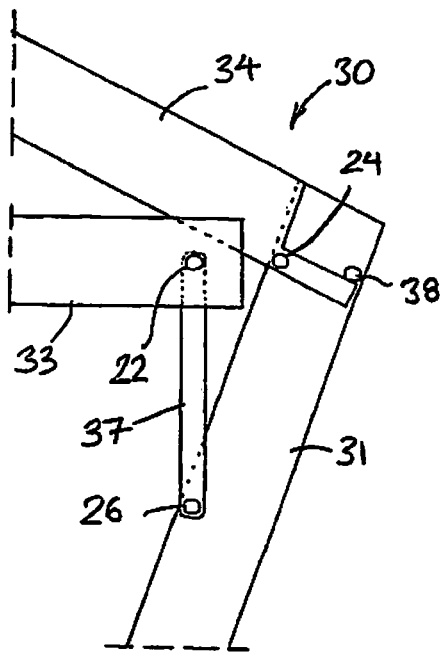
Figure 49:
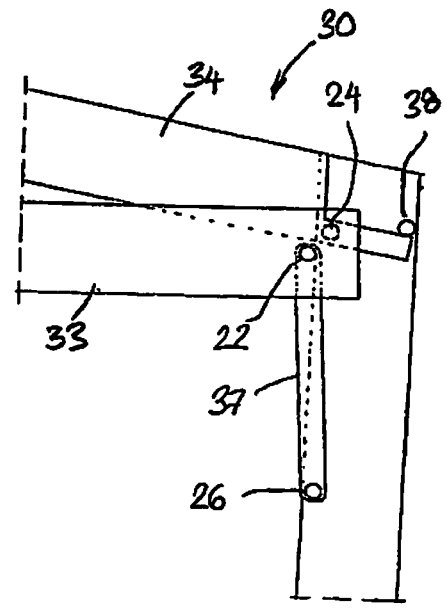

The example of FIGS. 48 and 49 relates to such a frame construction 30 of the saw 10, wherein a shaft part 37 is arranged between the handle part 31 and the support body 33. This kind of solutions are illustrated e.g. in FIGS. 7-10 and 36-41.

ADDITIONAL REMARKS

It is evident for a person skilled in the art that various embodiments of the invention may vary within the scope of the appended claims.

LISTING OF REFERENCE NUMERALS

10 collapsible saw
20 blade of the saw
21 fixing pin
22 fulcrum pin
23 fulcrum pin
24 fulcrum pin teeth
26 fulcrum pin
27 fulcrum pin
28 fulcrum pin
29 fulcrum pin
30 frame construction
31 handle part
32 front piece
33 support body
34 lever part
35 conduit
36 groove
37 shaft part
38 support surface
39 fixing loop
40 extension piece
41 fulcrum pin
42 support surface
43 fixing pin

The invention claimed is:

1. A collapsible saw comprising: a blade comprising a back edge and an edge having cutting teeth; a frame construction comprising a handle part with a groove, a lever part with a groove, a support body with a fixing loop, a shaft part, and a front piece; said handle part is rotatably attached at one end to said blade and is rotatably attached at another end to an end of said lever part; said shaft part is rotatably attached at one end to a mid-region of said handle part and is rotatably attached at another end to an end of said support body; said front piece is rotatably attached at one end to another end of said support body and is rotatably attached at another end to said blade; said frame construction is movable between a sawing position and a collapsed position; wherein when said frame construction is in said sawing position, said blade is tensioned and said lever part is above said blade and received by said fixing loop of the support body, and when said frame construction is in said collapsed position, said lever part and said handle part are below said blade and said cutting teeth are received in said grooves while said support body and said front piece are above said blade covering said back edge.

2. The collapsible saw of claim 1, wherein said fixing loop is attached to a mid-region of said support body.

3. The collapsible saw of claim 1, said support body is made up of two halves defining a space between said halves, wherein when said frame construction is in said collapsed position, said back edge of said blade is covered by said support body when said back edge is received in said space and when said frame construction is in said sawing position, at least a portion of said lever part is received in said space.

4. A collapsible saw comprising: a blade comprising a back edge and an edge having cutting teeth; a frame construction comprising a handle part with a groove, a lever part with a groove, a front piece, a shaft part, and a support body with a fixing loop, wherein the support body is made up of two halves defining a space between said halves; said handle part is rotatably attached at one end to said blade and is rotatably attached at another end to an end of said lever part; said shaft part is rotatably attached at one end to a mid-region of said handle part and is rotatably attached at another end to an end of said support body halves; said front piece is rotatably attached at one end to another end of said support body halves and is rotatably attached at another end to said blade; said frame construction is movable between a sawing position and a collapsed position; wherein when said frame construction is in said sawing position, said blade is tensioned, said lever part is above said blade and received by said fixing loop, and at least a portion of said lever part is received in said space, and when said frame construction is in said collapsed position, said lever part and said handle part are below said blade, said cutting teeth are received in said grooves, said support body halves and said front piece are above said blade, and said back edge of said blade is received in said space.

\* \* \* \* \*